Feb. 22, 1966  G. ALFIERI  3,236,567
APPARATUS FOR PNEUMATIC SYSTEMS OF AUTOMOTIVE VEHICLES
Filed Jan. 22, 1963  4 Sheets-Sheet 1

INVENTOR.
GIUSEPPE ALFIERI
BY
Michael S. Striker
Attorney

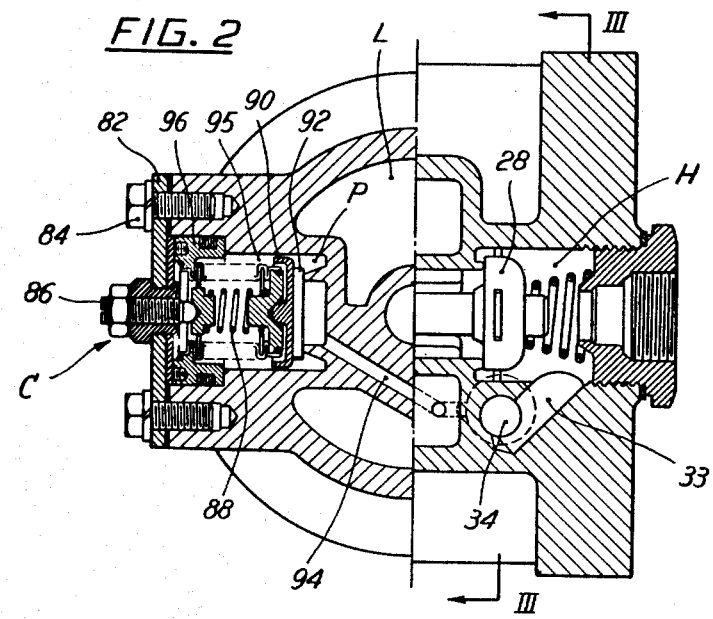
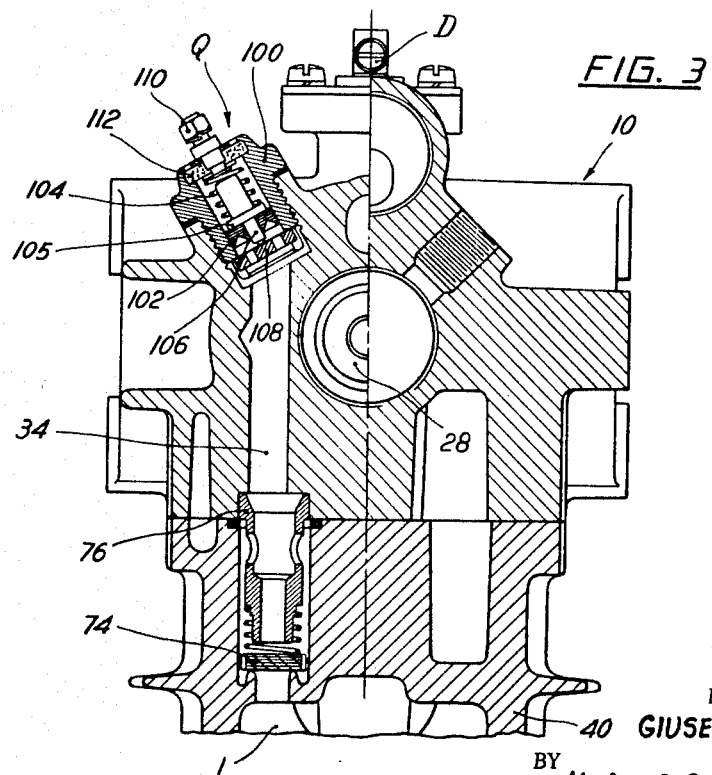

Feb. 22, 1966        G. ALFIERI        3,236,567
APPARATUS FOR PNEUMATIC SYSTEMS OF AUTOMOTIVE VEHICLES
Filed Jan. 22, 1963        4 Sheets-Sheet 3
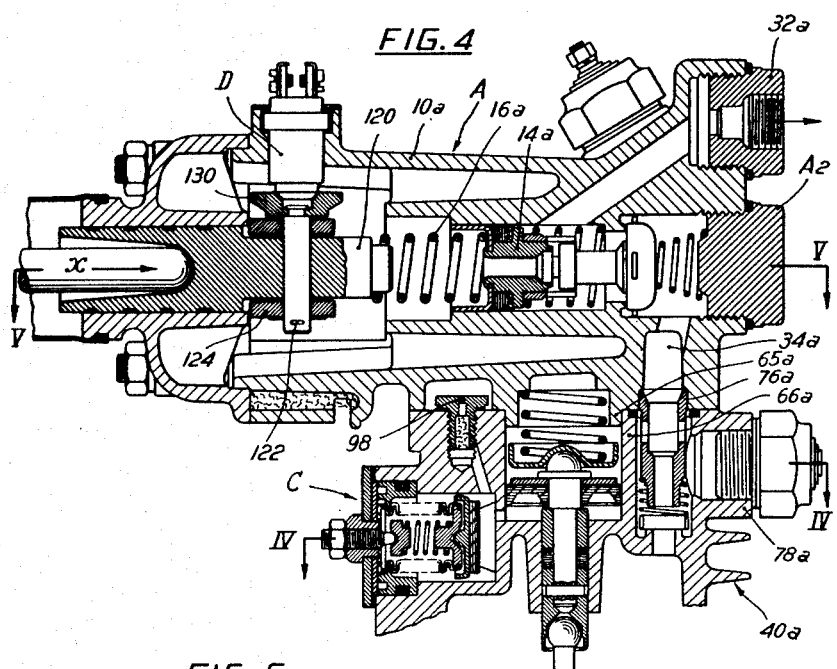
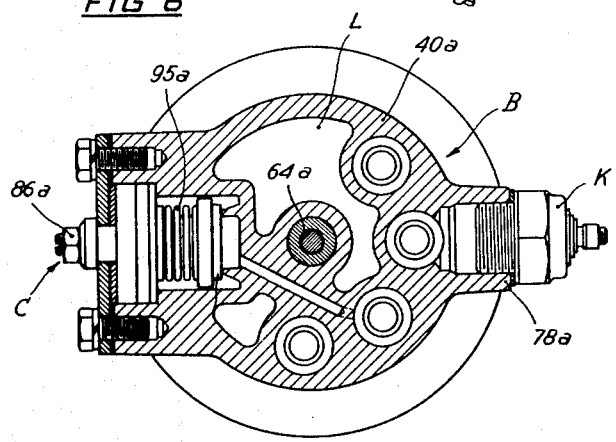
INVENTOR.
GIUSEPPE ALFIERI
BY Michael S. Striker,
Attorney

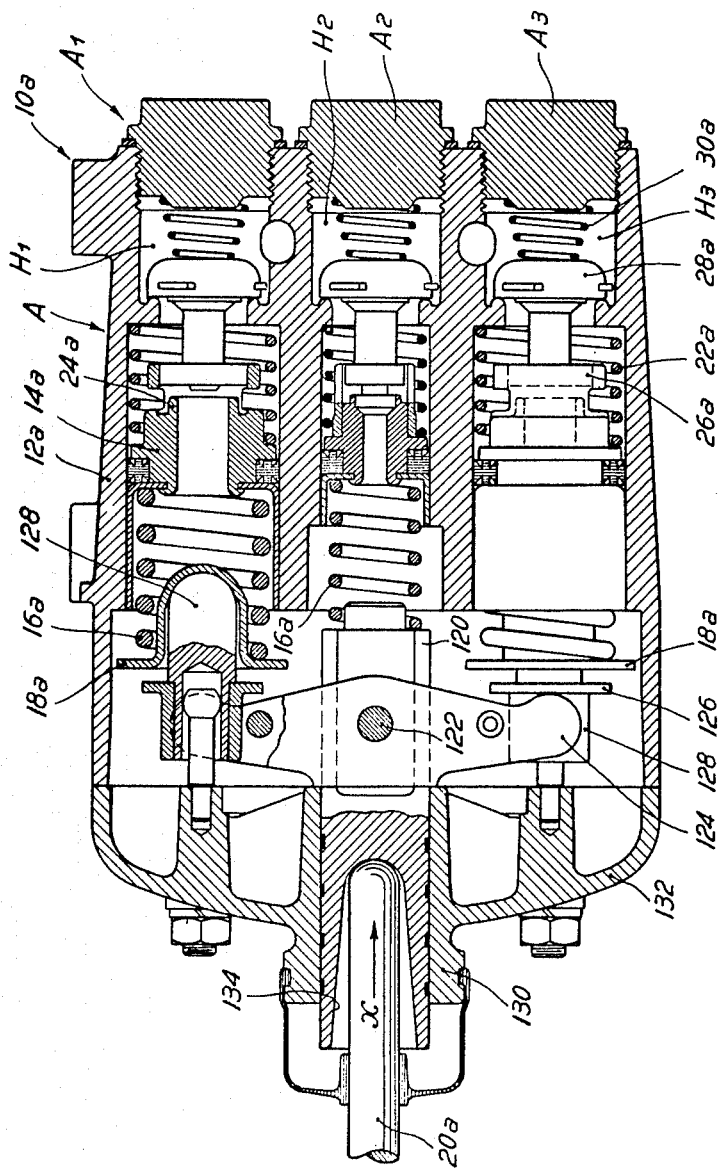

United States Patent Office 3,236,567
Patented Feb. 22, 1966

3,236,567
APPARATUS FOR PNEUMATIC SYSTEMS OF AUTOMOTIVE VEHICLES
Giuseppe Alfieri, Milan, Italy, assignor to Fabbrica Italiana Magneti Marelli S.p.A., Milan, Italy, a corporation of Italy
Filed Jan. 22, 1963, Ser. No. 253,181
Claims priority, application Italy, Apr. 2, 1959, Patent 607,002
5 Claims. (Cl. 303—54)

The present application is a continuation-in-part application of the application Serial No. 18,069 filed March 28, 1960 and now abandoned.

This invention relates to an apparatus for pneumatic systems usually installed in automotive vehicles and more particularly for braking plant thereof.

Object of the invention is to provide an apparatus of the specified type, which incorporates in a single combination or unit, the compressed air distributor for the brakes of the vehicle, the compressed air cleaner, the pressure regulator of the system and other elements, as safety valves, signaling and control members and so on.

Further object of the invention is to provide an apparatus of the specified type, wherein the arrangement of the different parts of the apparatus and particularly of the compressed air distributor and air cleaner is such to provide a unit of small dimensions and easy to install, wherein the main axis of said distributor and air cleaner are perpendicular to each other so that distributor and air cleaner can be respectively horizontally and vertically arranged. This arrangement enables to effect the kinematic connection of the distributor with the actuating members, through simplified transmission members which develop along a rectilinear path, particularly with regard to the fact that said actuating members, for obvious reasons, should exclude, as much as possible, the use of linkages and intermediate members.

Another object of the invention is to provide an apparatus which can be easily mounted and dismounted from the vehicle, in order to permit the necessary inspection operations and which eliminates and reduces the use of ducts and pipes indispensable when several members of the apparatus are foreseen as single separate elements.

Another and further object of the invention is to provide an air cleaner-pressure regulator group which can be applied indifferently to distributors with one or more braking sections and this with reference to the different situations arising from time to time.

The accompanying drawings show, as an illustrative exemplification, two preferred embodiments of the apparatus, according to the invention, wherein the air cleaner-pressure regulator group is similar and is interchangeable.

FIGURE 2 is a sectional view made along the line II—II of FIGURE 1.

FIGURE 3 is a sectional view made along the line III—III of FIGURE 2.

FIGURE 4 is an axial sectional view of an embodiment of the apparatus with a three-section distributor.

FIGURES 5 and 6 are sectional views made respectively along the lines V—V and VI—VI of FIGURE 4.

Figure 1:
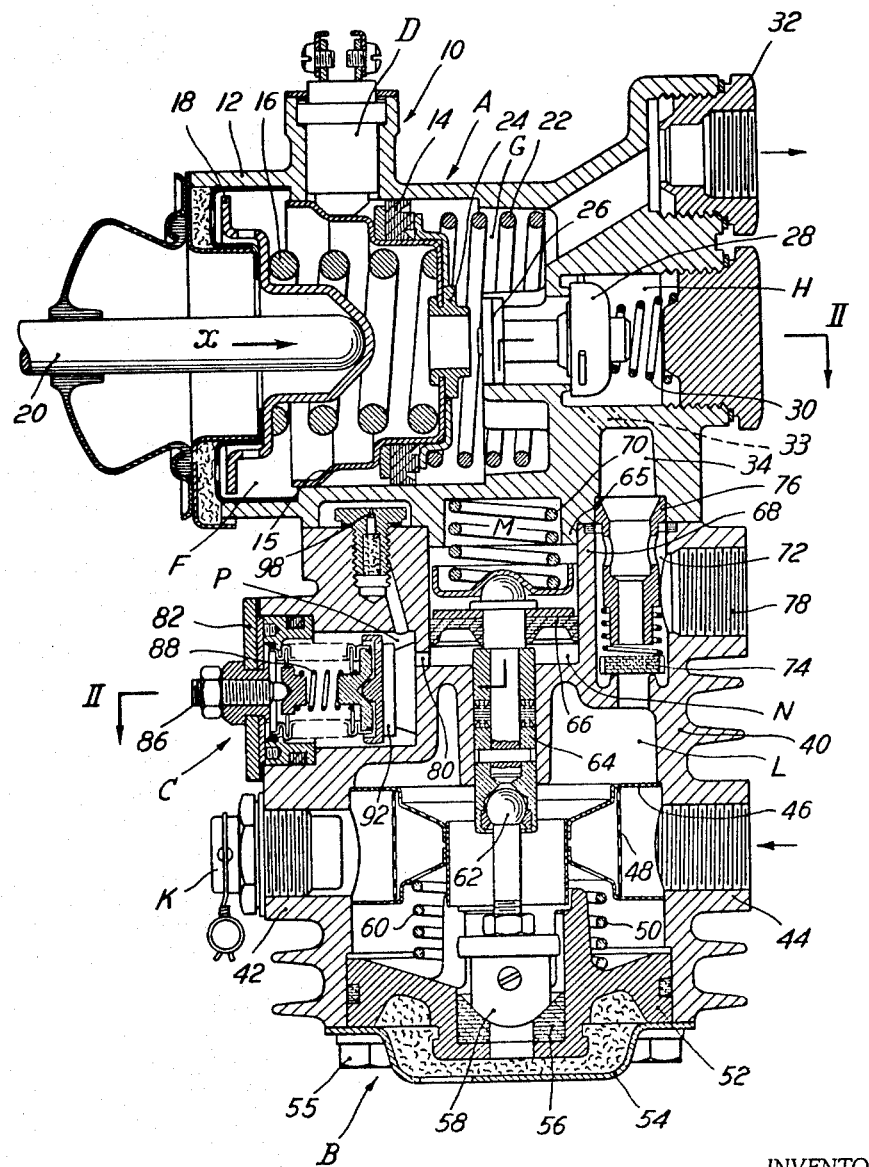
FIGURE 1 shows a vertical sectional view of the apparatus according to the invention, with a single section distributor.

Taking into consideration the two apparatus illustrated in FIGURES 1 to 3 and 4 to 6, each of said apparatus comprises a compressed-air-distributor A which feeds, in the manner later described, the kinematic mechanism which actuates the brakes; a cleaner B for the compressed air coming from the compressor and a pressure regulator C, combined, as later on will be described, with said cleaner B. Practically the distributor, either single or multi-section, constitutes a single separates element, connected movably with the cleaner-pressure regulator assembly B–C. Both units are arranged so that their longitudinal or principal axis are perpendicular to each other, in such a manner that the principal axis of the assembly B–C practically is vertical, while the principal axis of the distributor unit A is horizontal.

With reference now to the FIGURES 1 to 3 the distributor unit A comprises a body 10 provided, at one of its ends, with a cylinder 12 in which sealingly slides a piston 14, provided with a stepped bell-shaped cap 15, cooperating with the mobile member of an electric switch D, which controls the lighting of a lamp which warns the vehicle following the one under consideration of the actuation of the brakes of the latter.

The piston 14 is actuated through a spring 16 supported by a cap 18, through an operating push rod 20 which connects in a known manner and through a simplified tie rod, with the brakes actuating member, as, for example, a foot control lever. The piston 14 is opposed in its movement by a spring 22, accommodated on the bottom of the cylinder 12 and such piston, in correspondence with its axis, ends with a bored push rod 24, cooperating with a sealing bottom plate 26 incorporated with a valve 28, urged against its seating by a respective spring 30.

The piston 14 and the valve 28 define in the casing 10 chamber F (which communicates with the atmosphere through holes, not shown), chamber G (which connects, through a fitting 32, with the brakes actuating members) and chamber H (which connects, through the ducts 33 and 34 and through the cleaner-regulator group B–C, with the pressure regulator.

The cleaner-pressure regulator group B–C consists of a finned housing 40, the upper wall of which is tightened, in the manner which will be described later on, with the lower part of the body 10 through screwed means not shown, and such housing presents, in the lower section, in diametrically opposed position, fittings 42 and 44, of like dimensions, to one of which (in the illustrated case is the fitting 42) is applied a safety valve K which can be easily replaced, while the other fitting connects with a pipe coming from the compressor of the system.

In the inner part of such housing is movably accommodated a baffle plate 46, provided with a screen 48, which retains the solid substances eventually in suspension in the compressed air, which screen is pushed against a shoulder, provided in said housing by a coil spring 50. Such spring is supported by a cap 52, which closes the opening of the housing 40 and which is retained by a cover 54 through the screws 55.

The cap 52, in correspondence to its central portion, presents a seat 56 of a valve 58, which slidingly moves in a split crown 60 of the bottom plate 52 and which constitutes the relief valve.

The valve 58 is connected with a spherical head 62, articulated to a rod 64 of a piston 66 which slidingly moves in a cylinder 68, provided on the axis of the upper part of the casing. The piston 66 is biased by a spring 70, supported in the upper part by the bottom of the casing 10, the action of which keeps the valve 58 adherent against the respective seat 56. The interior of the housing 40 forms a cleaning chamber L and in this chamber is housed the baffle plate 46 and the strainer screen 48. In the upper part, the chamber connects with a duct 72 in which is inserted a retaining valve 74 in combination with a sleeve 76 which constitutes a connection with the duct 34, incorporated in the distributor A. The valve 74 permits the passage of air from the chamber L to the duct 34, but prevents such passage in the contrary direction.

The duct 72 connects also with a fitting 78 of the piping of the system, which feeds the other pneumatic apparatus usually installed in an automotive vehicle such as the braking system of a trailer, the pneumatic motor for actuating the windshield wipers, etc.

Chambers M and N, defined by the piston 66 in the respective cylinder 68, connects, the first one with the atmosphere through the gap provided between the casing 10 and the housing 40 and the second one, through the hole 80, with the pressure regulator C. The latter is constructed as a single element and is positioned movably in a housing incorporated with the housing 40 upon which is secured by a covering 82, through screw 84. The covering 82 holds an adjusting screw 86, which regulates the compression of a spring 88, acting, through a bottom plate 90, on a sealing valve 92.

This valve controls the communication between a chamber P to which is connected the formerly considered duct 80, and the duct 94 (FIG. 2), which connects with the duct 34 previously considered, to feed the pressure regulator C with air, having a pressure corresponding to that of the system in which the apparatus is inserted. To the rim of the bottom plate 90 is secured one end of a metallic bellows 95, the opposite end of which is fixed to a ring 96, retained from the covering 82 in such a manner that such bellows effect the sealing tightening between the chamber P and the atmosphere. The chamber P, however, is permanently in connection with the atmosphere through the calibrated outlet opening of a nozzle 98, which, on the upper side, is screwed to the housing 40.

With reference to the FIGURE 3, the casing 10, in correspondence to the end of the duct 34, provides a signaling device Q for the low pressure, formed with a sleeve 100 screwed to said casing 10, in the interior of which moves a piston 102, opposed to the action of a spring 104. The piston 102 is constituted by an elastic packing held by a flange 105, provided with a gudgeon pin 106, which flange holds also the spring 104.

The lower end of the gudgeon 106 constitutes a mobile contact, cooperating with a fixed contact 108, incorporated with the sleeve 100. Such contact is formed with a metallic bottom plate, which conductively connects, through the body 10 of the apparatus, with the ground terminal of the electric power installed in the considered vehicle. The other terminal of this power supply connects with a terminal 110 supported by an insulating plate 112 secured to the sleeve 100 and which terminal connects metallically with the gudgeon 106, through the spring 104, so to cut off the electric circuit every time the pressure in the apparatus goes to zero.

As already said, the cleaner-pressure regulator group B–C constitutes a unit which is interchangeable with other distributors. This purpose is easily achieved by giving to the housing 40 a cylindrical form, providing in the upper part thereof appropriate means for the connection with distributor A.

To this purpose, the body 10 of such distributor has, on the lower part, a crown 65 which engages in the upper opening of the cylinder 66, positioned along the principal axis of the housing 40. On the other hand, the projecting end of the sleeve 76, provided in said housing 40, engages in a shoulder of the rim of the hole 34 provided in the casing 10. It follows that the pneumatic and mechanical connection between the casing 10 and the housing 40 is easily and quickly achievable and such mechanical connection is effected by screwed members provided between both parts.

After what is described above, the operation of the apparatus is obvious: the air, coming from the compressor, enters into the chamber L of the cleaner B through the fitting 44 and passing through the baffle plate 46 and the strainer screen 48, is thoroughly cleaned. From the chamber L, the air, raising the valve 74, goes to the utilizers and, through the hole 34 actuates also the low pressure gauge Q, FIG. 3, contacts of which 106 and 108 are opened.

From the chamber L and through the hole 94, FIG. 2, air arrives to the pressure regulator C and, when the pressure in the system reaches a predetermined value, set up by the load of the spring 88, such pressure disengages the valve 92 from respective seat putting in communication chamber P with chamber L. But in chamber P sets up a certain pressure rate lower than the pressure existing in chamber L, since such chamber is in communication with the atmosphere through the calibrated opening 98. This pressure rate which sets up in chamber P, passes, through the hole 80, into the chamber N of the cylinder-piston group 66, 68. When the pressure, in chamber L increases, the pressure rate in chamber P increases also with a greater increment, till in the chamber N sets up a pressure rate which, exceeding a pre-determined limit, overcomes the action of the spring 70, acting on the piston 66 and the latter moves upward and disengages the valve 58 from the respective seat 56. It follows that the compressed air, existing in chamber L, together with the substances separated from the air, is discharged through the opening of the seat 56 and such discharge goes on till the working pressure in chamber P and therefore also the pressure of the system is not fallen to a predetermined limit, which enables the spring 88 to reclose the valve 92. After that, the action of the spring 70 recloses the valve 58.

During this situation, the compressed air can be freely drawn from the utilizers, and, for example, from the distributor A. The supply of compressed air to the braking members is effected by displacing the stem 20 of the distributor in the direction of the arrow X. The spring 16 is thus loaded and successively the piston 14 moves, actuating the switch D. In the same time, the push rod 24, engaging with the sealing bottom plate 26 from one side, closes the communication between the fitting 32 and the atmosphere and from the other side opens the valve 28, whereby, through such fitting 32, the braking members are fed with compressed air coming from chamber L of the cleaner, through the duct 34.

Taking into consideration the apparatus, according to the embodiment of FIGS. 4 and 6, like parts relative to FIGS. 1 to 3 are marked with same reference numerals having a small letter index.

In this embodiment the compressed air distributor A is of the triplex type (three sections), whilst the cleaner-pressure regulator group B–C is similar to and interchangeable, as already said, with that of FIGURES 1 to 3, since the dimensions of the crown 65, on the opening of the cylinder 66, of the sleeve 76 and of the hole 34, of both apparatus shown in the drawings, are similar. Since the cleaner-pressure regulator group B–C is similar to the one described in the case of FIGS. 1 to 3, the description of such group will be omitted. In this embodiment and taking into consideration what was formerly said, inlet of air is performed through the fitting 42a, while the fitting 44a is closed by the safety valve K. Instead the distributor unit A consists of three sections A1, A2, A3 all similar, each having a cap 18a for a spring 16a, acting on a piston 14a, which ends with a bored push rod 24a. The latter can engage a sealing bottom plate 26a, incorporated with the interception valve 28a, urged against the respective seat by a spring 30a, to control the communication of the braking members either with the compressed air supply or with the atmosphere. The spring 16a of the intermediate section A2 is held, by a gudgeon 120, to which gudgeon is pivoted through a pin 122, a rocker arm 124, the ends of which engage with the flanges 126 on the gudgeons 128, engaged with the respective caps 18a of the end sections A1 and A3. The gudgeon 120 slides in a hole 130 on the covering 132, fixed to the casing 10a, which gudgeon provides the seat 134 in which engages articulatedly the operating rod 20a of the distributor.

The electric switch D is arranged along the median axis of the distributor A and its mobile part engages with a cam 130, fixed to the pin 122 of the rocker arm 124, so that, when the latter is displaced in the direction of arrow X, such switch is actuated. The operation of the distributor is similar to that of the apparatus of FIGURES 1 to 3, with the only difference that the movement of the gudgeon 120, oscillating the rocker arm 124, actuates in the considered manner, the pistons 14a of the three sections, which pistons open the valves 28a of such sections.

I claim:

1. Apparatus for pneumatic braking systems installed in automotive vehicles for regulating the pressure and cleaning the compressed air in such systems comprising, in combination, a first casing having a longitudinal axis; annular air cleaning means arranged in said first casing coaxial with the axis thereof and dividing the casing in an outer and an inner chamber; inlet means communicating with said outer chamber for feeding compressed air therein so that the air may pass through said annular air cleaning means into said inner chamber; a relief valve coaxial with said casing at the bottom thereof and movable between a closed position and an open position in which latter position said relief valve discharges compressed air from said inner chamber; wall means in said casing and defining a cylinder separated from said inner chamber and coaxial with said relief valve and a regulating chamber extending transversely to the axis of said casing; a piston movable in said cylinder between a raised and lowered position, said piston having a side facing said relief valve and defining with said cylinder a pressure chamber; spring means cooperating with said piston and biased to yieldably maintain the latter in said lowered position; passage means defining communication between said inner chamber and said regulating chamber and between said regulating chamber and said pressure chamber; spring actuated pressure regulator means in said regulating chamber and cooperating with said passage means for normally closing the same and for opening the same when the pressure in said inner chamber surpasses a predetermined pressure so that compressed air from said inner chamber may pass into said pressure chamber of said cylinder moving thereby said piston from said lowered to said upper position; connecting means connecting said piston with said relief valve for moving the latter to said open position when said piston is in said upper position; a second casing removably connected to the upper end of said first casing and having a longitudinal axis normal to that of said first casing, said second casing defining a valve chamber having a valve seat coaxial with the axis of said second casing; passage means providing communication with said inner chamber of said first casing and said valve chamber of said second casing; a one-way valve in said last mentioned passage means permitting flow of compressed air from said inner chamber to said valve chamber while preventing air flow in the opposite direction; a valve member engaging said valve seat and movable between a closed and an open position; spring means cooperating with said valve member and biased to yieldably maintain the latter in said closed position; operator controlled operating means coaxial with the valve seat and cooperating with the valve member for moving the latter against the force of said spring means from said closed to said open position; and passage means on the downstream side of the valve seat for directing air from said valve chamber to a brake actuating mechanism when said valve member is in said open position.

2. An apparatus as set forth in claim 1, wherein said first casing has an upper end face normal to its axis and said second casing has a bottom face parallel to its axis and abutting against said end face of said first casing, wherein said cylinder in said first casing has an open upper end ending in said upper end face and said second casing has an annular rim projecting downwardly from said bottom face thereof and fitting tightly in said upper open end of said cylinder, and wherein said passage means providing communication between said inner chamber and said valve chamber has a first portion formed in said first casing and a second portion aligned along a common axis parallel to the axis of said first casing with said first portion and being formed in said second casing, and including a sleeve fitted in one part of said passage means and projecting into the other part thereof.

3. Apparatus as set forth in claim 1, wherein said first casing has an open lower end, and including a bottom plate removably connected to and closing said lower end of said first casing, said bottom plate being formed with a central opening therethrough forming a valve seat for said relief valve.

4. Apparatus as set forth in claim 3, wherein said first casing is formed with an inwardly extending annular shoulder arranged coaxial with the axis of said first casing, wherein said annular air cleaning means has an upper annular portion engaging said shoulder, and including spring means abutting with opposite ends thereof against said bottom plate and said annular air cleaning means to resiliently maintain said upper portion of the latter in abutting relationship with said shoulder and permitting removal of said air cleaning means from the interior of said first casing upon removal of said bottom plate.

5. Apparatus as set forth in claim 1 and including an additional passage provided with a calibrated opening for providing communication between said regulating chamber and the atmosphere.

References Cited by the Examiner

UNITED STATES PATENTS

| 2,013,031 | 9/1935 | Campbell | 137—545 |
|---|---|---|---|
| 2,016,541 | 10/1936 | Campbell | 55—313 |
| 2,356,410 | 8/1944 | Krugler | 137—613 |
| 2,406,214 | 8/1946 | Carnier | 55—216 |
| 2,427,525 | 9/1947 | Glanzer | 55—250 |
| 2,537,094 | 1/1951 | Schmidlin | 55—213 |
| 2,671,527 | 3/1954 | Moon | 55—216 |
| 2,707,051 | 4/1955 | Mailhot et al. | 55—417 |
| 2,831,500 | 4/1958 | Fennema | 137—614.20 |
| 2,836,256 | 5/1958 | Caskey | 55—293 |
| 2,864,461 | 12/1958 | Dueker | 55—213 |

FOREIGN PATENTS 738,010    7/1943    Germany.

EUGENE G. BOTZ, *Primary Examiner.*

HARRY B. THORNTON, *Examiner.*